United States Patent
Ma et al.

(10) Patent No.: US 9,964,786 B2
(45) Date of Patent: May 8, 2018

(54) OUTER FRAME AND DISPLAY DEVICE

(71) Applicant: BOE TECHNOLOGY GROUP CO., LTD., Beijing (CN)

(72) Inventors: Yongda Ma, Beijing (CN); Yuxin Zhang, Beijing (CN); Yong Qiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 26 days.

(21) Appl. No.: 14/913,044

(22) PCT Filed: Sep. 18, 2015

(86) PCT No.: PCT/CN2015/089975
§ 371 (c)(1),
(2) Date: Feb. 19, 2016

(87) PCT Pub. No.: WO2016/155259
PCT Pub. Date: Oct. 6, 2016

(65) Prior Publication Data
US 2017/0038631 A1    Feb. 9, 2017

(30) Foreign Application Priority Data
Apr. 1, 2015    (CN) ............... 2015 2 0193117 U

(51) Int. Cl.
*G02F 1/1333* (2006.01)
*F21V 8/00* (2006.01)

(52) U.S. Cl.
CPC ....... *G02F 1/133308* (2013.01); *G02B 6/009* (2013.01); *G02B 6/0088* (2013.01);
(Continued)

(58) Field of Classification Search
None
See application file for complete search history.

(56) References Cited

U.S. PATENT DOCUMENTS 9,459,477 B2 * 10/2016 Lee .................. G02F 1/133308
2002/0050977 A1    5/2002 Hsieh et al.
(Continued)

FOREIGN PATENT DOCUMENTS

| CN | 101681040 A | 3/2010 |
| CN | 202275236 U | 6/2012 |
| CN | 204479876 U | 7/2015 |

OTHER PUBLICATIONS

International Search Report dated Dec. 23, 2015 corresponding to International Application No. PCT/CN2015/089975.
(Continued)

*Primary Examiner* — Ryan Crockett
(74) *Attorney, Agent, or Firm* — Nath, Goldberg & Meyer; Joshua B. Goldberg; Tanya E. Harkins

(57) ABSTRACT

The present invention provides an outer frame and a display device. The outer frame is configured to package an edge of a liquid crystal module and includes at least one sub frame, the sub frame comprises a side plate, a first packaging plate, a second packaging plate and a supporting plate, the side plate, the first packaging plate, the second packaging plate and the supporting plate are formed integrally, a first accommodation groove for accommodating an edge of the liquid crystal module is formed by the side plate, the first packaging plate and the supporting plate, and a second accommodation groove for accommodating an edge of the back cover plate configured to cover the back surface of the liquid crystal module is formed by the side plate, the supporting plate and the second packaging plate.

18 Claims, 2 Drawing Sheets

(52) U.S. Cl.
CPC ............ *G02F 2001/133314* (2013.01); *G02F 2001/133317* (2013.01); *G02F 2001/133322* (2013.01); *G02F 2001/133328* (2013.01)

(56) References Cited

U.S. PATENT DOCUMENTS

| | | | | |
|---|---|---|---|---|
| 2010/0085504 A1* | 4/2010 | Shin | ................ | G02F 1/133608 349/58 |
| 2010/0171900 A1* | 7/2010 | Lee | ................ | G02F 1/133308 349/58 |
| 2011/0051033 A1 | 3/2011 | Shimizu | | |
| 2011/0090426 A1* | 4/2011 | Choi | ................ | G02B 6/009 349/65 |
| 2011/0134346 A1* | 6/2011 | Hayashi | ............ | G02F 1/133308 348/790 |
| 2012/0242926 A1* | 9/2012 | Hsu | ................ | G02F 1/133308 349/58 |
| 2013/0027965 A1* | 1/2013 | Noh | ................ | G02F 1/133308 362/602 |
| 2013/0100372 A1* | 4/2013 | Wu | ................ | G02B 6/0088 349/58 |
| 2013/0201421 A1* | 8/2013 | Yu | ................ | G02F 1/133308 349/58 |
| 2014/0132880 A1* | 5/2014 | Zhao | ................ | G02F 1/133308 349/58 |

OTHER PUBLICATIONS

Written Opinion of the International Searching Authority dated Dec. 23, 2015 corresponding to International application No. PCT/CN2015/089975.

* cited by examiner

OUTER FRAME AND DISPLAY DEVICE

This is a National Phase Application filed under 35 U.S.C. 371 as a national stage of PCT/CN2015/089975 filed on Sep. 18, 2015, an application claiming the benefit of Chinese Application No. 201520193117.6 filed on Apr. 1, 2015, the content of each of which is hereby incorporated by reference in its entirety.

FIELD OF THE INVENTION

The present invention relates to the field of display technology, and particularly relates to an outer frame and a display device.

BACKGROUND OF THE INVENTION

With the development of display technology and the progress of society, liquid crystal display (LCD) devices have been used more and more widely, and play an essential role in industry production and the people's lives.

Liquid crystal module is a main component in a LCD device, and a frame is generally provided at peripheral edges of the liquid crystal module after manufacturing, the frame being able to package peripheral edges of the liquid crystal module to make the package of the liquid crystal module more firm and to make the display device have a better look.

At present, frame for packaging edges of the liquid crystal module generally has integrated structure, that is, an integrated frame that surrounds peripheral edges of the whole liquid crystal module. Back surface (i.e., back surface of the liquid crystal module not for display) of the display device is provided with a back cover plate which is connected and fixed to the back plate by screws. A front frame is also required to be provided at a display surface (i.e., the front surface of the liquid crystal module that is used to display) of the liquid crystal module, and the front frame is provided at peripheral edges of the display surface of the liquid crystal module. After the integrated frame is mounted, the front frame and the integrated frame are made clasped. The front frame may function to fasten the liquid crystal screen in the display device.

Conventional display device which adopts integrated frame has a large entire thickness. In addition, a connection gap between the back cover plate and the front frame is exposed outside, which affects appearance of the display device.

SUMMARY OF THE INVENTION

In view of the above technical problems in the related art, the present invention provides an outer frame and a display device. The outer frame can not only achieve excellent packaging for edges of a liquid crystal module and a back cover plate of the display device, but also make the packaged display device with no packaging gap at the edges thereof when looking aside, so that appearance of the display device packaged with the outer frame gets a better look while the display device packaged with the outer frame can be thinner.

The present invention provides an outer frame for packaging edge(s) of a liquid crystal module, the outer frame including at least one sub frame which comprises a side plate, a first packaging plate, a second packaging plate and a supporting plate, the side plate, the first packaging plate, the second packaging plate and the supporting plate are formed integrally, a first accommodation groove for accommodating the edge(s) of the liquid crystal module is formed by the side plate, the first packaging plate and the supporting plate, a second accommodation groove for accommodating edge(s) of the back cover plate, which is configured to cover a back surface of the liquid crystal module, is formed by the side plate, the supporting plate and the second packaging plate.

Preferably, the first packaging plate and the second packaging plate are parallel to the supporting plate disposed therebetween, the side plate is perpendicular to the first packaging plate, the second packaging plate and the supporting plate, and the first accommodation groove has the same opening direction as the second accommodation groove.

Preferably, the liquid crystal module includes a backlight module and a liquid crystal screen; the backlight module includes a back plate, a reflective sheet, a light guide plate and an optical film sheet sequentially provided on a bottom plate of the back plate, a plastic frame provided at edges of the back plate, and a light source provided on the back plate; the liquid crystal screen is provided on a side of the optical film sheet away from the bottom plate of the back plate;

the first packaging plate is configured to face and contact an edge of an upper surface of the liquid crystal screen away from the backlight module, the supporting plate is configured to face and contact an edge of a lower surface of the bottom plate away from the liquid crystal screen, and the side plate is configured to face and contact an outer surface of the plastic frame away from end surface at the edge of the liquid crystal screen;

the second packaging plate is configured to face and contact an edge of a lower surface of the back cover plate away from the liquid crystal module, and the side plate is further configured to face an end surface at the edge of the back cover plate.

Preferably, a surface of the first packaging plate contacting the liquid crystal screen is provided with a first convex part which contacts the liquid crystal screen; and/or a surface of the supporting plate contacting the bottom plate is provided with a second convex part, a surface of the bottom plate contacting the supporting plate is provided with a second concave part, and the second convex part is located at a position corresponding to the second concave part and has a size and shape fitting to the second concave part; and/or a surface of the second packaging plate contacting the back cover plate is provided with a third concave part, a surface of the back cover plate contacting the second packaging plate is provided with a third convex part, and the third concave part is located at a position corresponding to the third convex part and has a size and shape fitting to the third convex part.

Preferably, the surface of the supporting plate contacting the bottom plate is provided with a second concave part, the surface of the bottom plate contacting the supporting plate is provided with a second convex part, and the second convex part is located at a position corresponding to the second concave part and has a size and shape fitting to the second convex part; and/or the surface of the second packaging plate contacting the back cover plate is provided with a third convex part, the surface of the back cover plate contacting the second packaging plate is provided with a third concave part, and the third concave part is located at a position corresponding to the third convex part and has a size and shape fitting to the third convex part.

Preferably, the surface of the supporting plate contacting the bottom plate is provided with a second convex part, the surface of the bottom plate contacting the supporting plate is provided with a third convex part, the positions of the second convex part and the third convex part are staggered, and the second convex part and the third convex part contact with each other side by side; and/or the surface of the second packaging plate contacting the back cover plate is provided with a fourth convex part, the surface of the back cover plate contacting the second packaging plate is provided with a fifth convex part, the fourth convex part and the fifth convex part are staggered, and the fourth convex part and the fifth convex part contact each other side by side.

Preferably, longitudinal section of the first convex part has a rectangular shape, a triangular shape, a semicircular shape or an isosceles trapezoidal shape;

longitudinal sections of the second convex part and the second concave part have a rectangular shape, a triangular shape, a semicircular shape or an isosceles trapezoidal shape; and longitudinal sections of the third concave part and the third convex part have a rectangular shape, a triangular shape, a semicircular shape or an isosceles trapezoidal shape.

Preferably, longitudinal sections of the second convex part and the second concave part have a rectangular shape, a triangular shape, a semicircular shape or an isosceles trapezoidal shape; and longitudinal sections of the third concave part and the third convex part have a rectangular shape, a triangular shape, a semicircular shape or an isosceles trapezoidal shape.

Preferably, longitudinal sections of the second convex part and the third convex part have a rectangular shape, a triangular shape, a semicircular shape or an isosceles trapezoidal shape; and longitudinal sections of the fourth convex part and the fifth convex part have a rectangular shape, a triangular shape, a semicircular shape or an isosceles trapezoidal shape.

Preferably, a surface of the side plate opposite to the plastic frame is set to a cambered surface which protrudes in a direction away from the end surface at the edge of the liquid crystal module.

Preferably, the supporting plate is provided with at least one first connecting hole, and the bottom plate is provided with at least one second connecting hole at position corresponding to the first connecting hole; and the outer frame further includes a first connector which can pass through the first connecting hole and the second connecting hole to connect and fix the supporting plate and the bottom plate.

Preferably, the outer frame includes a plurality of sub frames configured to package various edges of the liquid crystal module, respectively, and end parts of adjacent sub frames join each other.

Preferably, the outer frame further includes a second connector, which connects the joined end parts of the two adjacent sub frames and is provided at a side of the supporting plate facing the second packaging plate.

Preferably, the second connector includes a first connecting part and a second connecting part connected integrally, the first connecting part overlaps with the joined end parts of two adjacent sub frames which are adjacent thereto, the second connecting part is on an inner side of the first connecting part close to the area of the bottom plate, and the second connecting part faces and contacts the bottom plate; and the first connecting part connects to the supporting plates of two adjacent sub frames, and the second connecting part connects to the bottom plate.

The invention further provides a display device including the above outer frame.

The advantageous effect of the present invention is that, by means of providing the first accommodation groove and the second accommodation groove, the outer frame provided by the present invention not only achieves excellent packaging for edges of the liquid crystal module, but also makes the edges of the back cover plate which covers the back surface of the liquid crystal module be packaged and fixed more firmly. Since the edges of the liquid crystal module are accommodated within the first accommodation groove and the edges of the back cover plate are accommodated within the second accommodation groove, the packaging gaps at the edges of the display device is invisible after packaged with the outer frame, so the appearance of the display device packaged with the outer frame gets a better look. Meanwhile, compared to the outer frame in the prior art, the outer frame in the present invention can package the edges of the liquid crystal module without the front frame, so that the entire thickness of the packaged display device is significantly reduced. In addition, edges of the liquid crystal module and the back cover plate can be packaged with the outer frame finally by means of sliding the edges within the first accommodation groove and the second accommodation groove, and the means of sliding significantly eases the mounting of the outer frame and makes the mounting of the outer frame more convenient and efficient.

By use of the above outer frame, the display device provided by the present invention makes no gap at the edge(s) of the display device visible from a side view, so that the display device has a better look; meanwhile, since the display device does not need to provide any front frame, the thickness thereof is significantly reduced.

Figure 1:
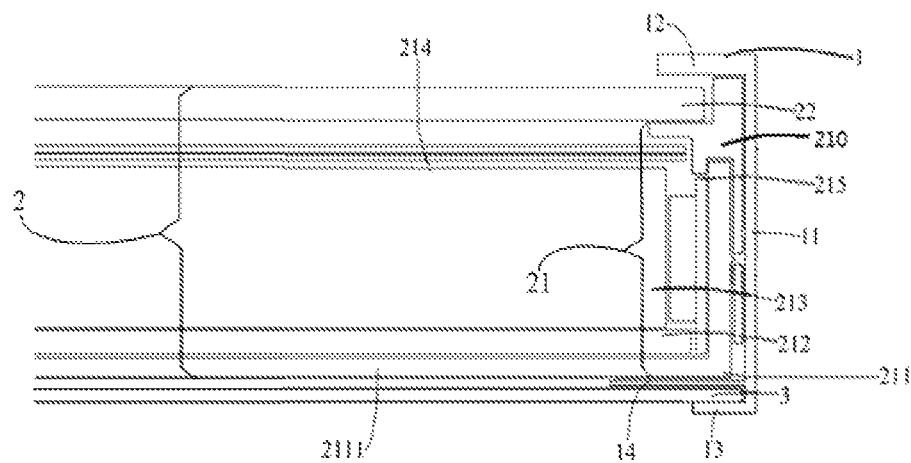
FIG. 1 is a structural cross-sectional diagram of an outer frame packaging a liquid crystal module in Embodiment 1 of the present invention.

Reference numerals therein:

1. sub frame; 11. side plate; 111. cambered surface; 12. first packaging plate; 121. first convex part; 13. second packaging plate; 131. third concave part; 14. supporting plate; 141. second convex part; 142. first connecting hole; 15. first accommodation groove; 16. second accommodation groove; 2. liquid crystal module; 21. backlight module; 210. plastic frame; 211. back plate; 2111. bottom plate; 212. reflective sheet; 213. light guide plate; 214. optical film sheet; 215. light source; 22. liquid crystal screen; 3. back cover plate; 4. second connector; 41. first connecting part; 42. second connecting part.

DETAILED DESCRIPTION OF THE EMBODIMENTS

To make those skilled in the art better understand the technical solutions of the present invention, an outer frame and a display device provided in the present invention are further described in detail below in conjunction with the accompanying drawings and specific implementations.

Embodiment 1

Figure 2:
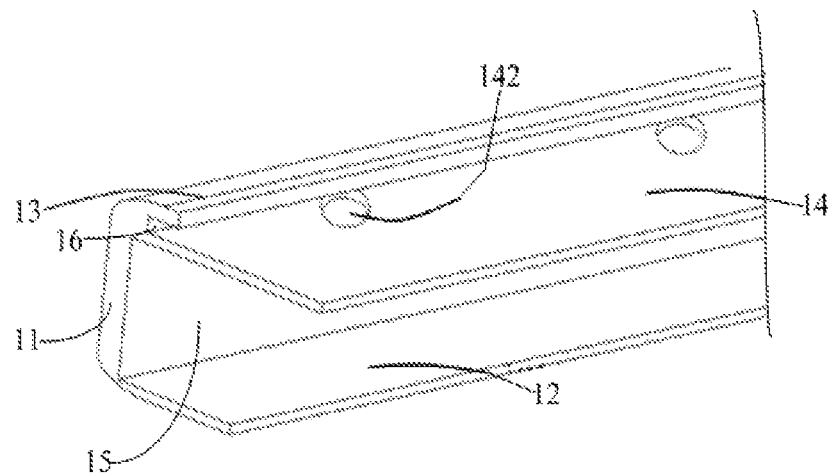
FIG. 2 is a structural schematic diagram of the outer frame in FIG. 1.

As shown in FIGS. 1 and 2, the present embodiment provides an outer frame for packaging edge(s) of a liquid crystal module 2, the outer frame including a sub frame 1 which comprises a side plate 11, a first packaging plate 12, a second packaging plate 13 and a supporting plate 14, wherein, the side plate 11, the first packaging plate 12, the second packaging plate 13 and the supporting plate 14 are formed integrally, a first accommodation groove 15 for accommodating an edge of the liquid crystal module 2 is formed by the side plate 11, the first packaging plate 12 and the supporting plate 14, a second accommodation groove 16 for accommodating an edge of the back cover plate 3, which is configured to cover the back surface of the liquid crystal module 2, is formed by the side plate 11, the supporting plate 14 and the second packaging plate 13.

It needs to be noted that the back surface of the liquid crystal module 2 refers to a surface opposite to the display surface of the liquid crystal module 2.

By being provided with the first accommodation groove 15 and the second accommodation groove 16, the outer frame can not only achieve excellent packaging for the edge(s) of the liquid crystal module 2, but also make the back cover plate 3 covering the back surface of the liquid crystal module 2 to be well packaged and fastened. Since the edge of the liquid crystal module 2 is accommodated within the first accommodation groove 15 and the edge of the back cover plate 3 is accommodated within the second accommodation groove 16, packaging gap at the edge of the display device is invisible after packaged with the outer frame. Thus the appearance of the display device packaged with the outer frame gets a better look. Meanwhile, compared to the outer frame in the prior art, the outer frame in the present embodiment can package the edge of the liquid crystal module 2 without the front frame, so that the entire thickness of the packaged display device is significantly reduced. In addition, edges of the liquid crystal module 2 and the back cover plate 3 can be packaged with the outer frame finally by means of sliding the edges within the first accommodation groove 15 and the second accommodation groove 16, and the means of sliding significantly eases the mounting of the outer frame and makes the mounting of the outer frame more convenient and efficient.

In the present embodiment, the first packaging plate 12 and the second packaging plate 13 are parallel to the supporting plate 14 disposed therebetween, the side plate 11 is perpendicular to the first packaging plate 12, the second packaging plate 13 and the supporting plate 14, and the first accommodation groove 15 has the same opening direction as the second accommodation groove 16. Such arrangement facilitates packaging edges of both the liquid crystal module 2 and the back cover plate 3 at the same time, and also makes the packaging gap invisible from a side view after packaging the edges of the display device with the outer frame, so the appearance of the display device packaged with the outer frame gets a better look.

In the present embodiment, the liquid crystal module 2 includes a backlight module 21 and a liquid crystal screen 22; the backlight module 21 includes a back plate 211, a reflective sheet 212, a light guide plate 213 and an optical film sheet 214 sequentially provided on a bottom plate 2111 of the back plate 211, a plastic frame 210 provided at the edges of the back plate 211, and a light source 215 provided on the back plate 211; the liquid crystal screen 22 is provided on a side of the optical film sheet 214 away from the bottom plate 2111 of the back plate 211.

The first packaging plate 12 is configured to face edges of an upper surface of the liquid crystal screen 22 away from the backlight module 21 and contact therewith, that is, the first packaging plate 12 is configured to package and fix the edges of the liquid crystal screen 22, the first packaging plate 12 is provided so that the front frame for packaging and fixing edges of the liquid crystal screen 22 is not needed any more, facilitating to decrease the thickness of the whole display device after packaged. The supporting plate 14 is configured to face edges of a lower surface of the bottom plate 2111 away from the liquid crystal screen 22 and contact therewith, that is, the supporting plate 14 is configured to package and fix the edges of the bottom plate 2111 of the back plate 211. The side plate 11 is configured to face an outer surface of the plastic frame 210 away from end surfaces at edges of the backlight module 21 and the liquid crystal screen 22 and contact therewith, that is, the side plate 11 is configured to package the end surfaces at edges of the backlight module 21 and the liquid crystal screen 22. Such arrangement allows the first accommodation groove 15 to surround and package the liquid crystal module 2, and can also make the packaging gap at the edges of the packaged display device invisible from a side view.

The second packaging plate 13 is configured to face edges of a lower surface of the back cover plate 3 away from the liquid crystal module 2 and contact therewith, that is, the second packaging plate 13 is configured to package and fix the edges of the back cover plate 3. The side plate 11 is further configured to face end surfaces at the edges of the back cover plate 3. Such arrangement allows the second accommodation groove 16 to surround and package the edges of the back cover plate 3, and can also make the packaging gap at the edges of the packaged display device invisible from a side view.

Figure 3:
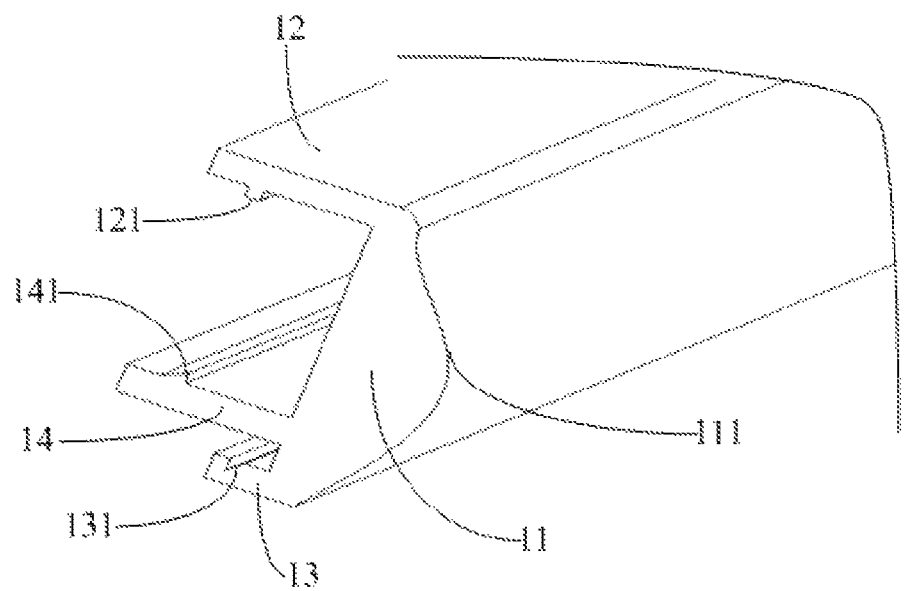
FIG. 3 is a structural schematic diagram of a portion of the outer frame in FIG. 1 contacting the liquid crystal module and a back cover plate.

In the present embodiment, as shown in FIG. 3, a surface of the first packaging plate 12 contacting the liquid crystal screen 22 is provided with a first convex part 121 which may contact the liquid crystal screen 22. The arrangement of the first convex part 121 enables the first packaging plate 12 to fit to the liquid crystal screen 22 more closely, so that the liquid crystal screen 22 is fixed and packaged with the first packaging plate 12 more firmly.

In the present embodiment, a surface of the supporting plate 14 contacting the bottom plate 2111 is provided with a second convex part 141, a surface of the bottom plate 2111 contacting the supporting plate 14 is provided with a second concave part, and the second convex part 141 is located at a position corresponding to the second concave part and has a size and shape fitting to the second concave part. The arrangement of the second concave part 141 enables the supporting plate 14 to fit to the bottom plate 2111 more closely, so that the bottom plate 2111 is fixed and packaged with the supporting plate 14 more firmly.

In the present embodiment, a surface of the second packaging plate 13 contacting the back cover plate 3 is provided with a third concave part 131, a surface of the back cover plate 3 contacting the second packaging plate 13 is provided with a third convex part, and the third concave part 131 is located at a position corresponding to the third convex part and has a size and shape fitting to the third convex part. The arrangement of the third concave part 131 enables the second packaging plate 13 to fit to the back cover plate 3 more closely, so that the back cover plate 3 is fixed and packaged with the second packaging plate 13 more firmly.

In the present embodiment, longitudinal section of the first convex part 121 has a rectangular shape. It needs to be noted that the longitudinal section of the first convex part 121 may also have a triangular shape, a semicircular shape or an isosceles trapezoidal shape and the like as long as the first convex part 121 may fix the liquid crystal screen 22 firmly.

Longitudinal sections of the second convex part 141 and the second concave part have a triangular shape. It needs to be noted that the longitudinal sections of the second convex part 141 and the second concave part may also have a rectangular shape, a semicircular shape or an isosceles trapezoidal shape and the like as long as the second convex part 141 may fit to the second concave part closely.

Longitudinal sections of the third concave part 131 and the third convex part have a triangular shape. It needs to be noted that the longitudinal sections of the third concave part 131 and the third convex part may also have a rectangular shape, a semicircular shape or an isosceles trapezoidal shape and the like as long as the third concave part 131 may fit to the third convex part closely.

In the present embodiment, a surface of the side plate 11 opposite to the plastic frame 210 is set to a cambered surface 111 which protrudes in a direction away from the end surface at the edge of the liquid crystal module 2, as shown in FIG. 3. Such arrangement can make the appearance of the edges of the display device packaged with the outer frame gets a better look from a side view, and also make the display device packaged with the outer frame thinner.

In the present embodiment, as shown in FIG. 2, the supporting plate 14 is provided with at least one first connecting hole 142, and the bottom plate 2111 is provided with at least second connecting hole at position corresponding to the first connecting hole 142. The outer frame further includes a first connector which can pass through the first connecting hole 142 and the second connecting hole to connect and fix the supporting plate 14 and the bottom plate 2111. Such arrangement enables the supporting plate 14 to package and fix the bottom plate 2111 more firmly.

Here, both of the first connecting hole 142 and the second connecting hole are set to screw holes and a screw is used as the first connector, wherein the screw holes can fit closely to the screw to make the supporting plate 14 be connected firmly with the bottom plate 2111.

Figure 4:
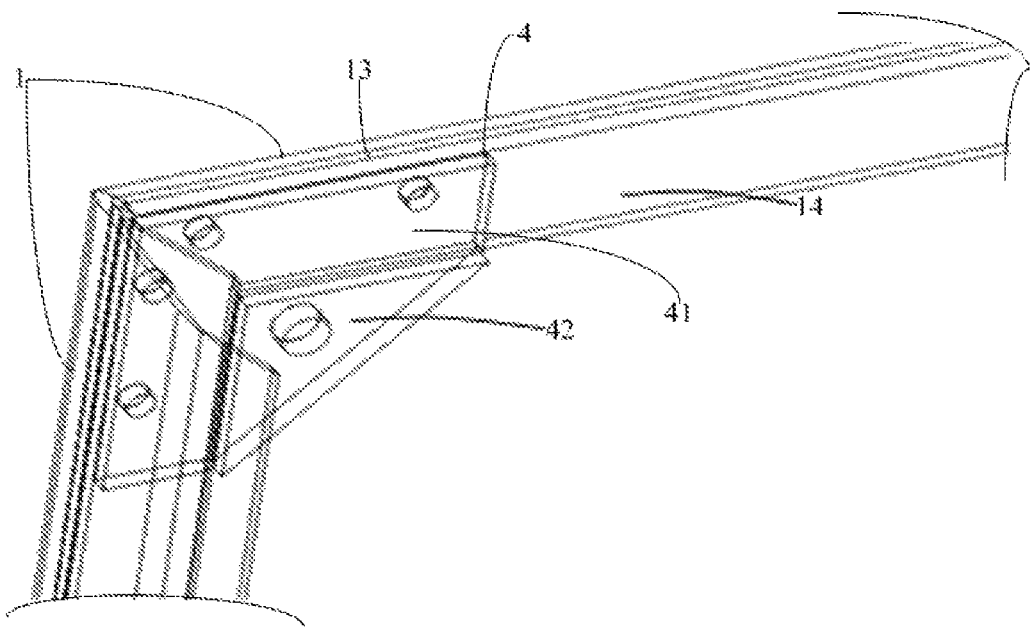
FIG. 4 is a structural schematic diagram of a second connector of the outer frame in FIG. 1.

According to the embodiments of the present invention, as shown in FIG. 4, the outer frame may include a plurality of sub frames 1 used to package various edges of the liquid crystal module 2, respectively, and end parts of adjacent sub frames join each other.

In the present embodiment, the outer frame further includes a second connector 4, which connects the joined end parts of adjacent two sub frames 1 and is provided at a side of the supporting plate 14 facing the second packaging plate 13.

Here, the second connector 4 includes a first connecting part 41 and a second connecting part 42 connected integrally, wherein, the first connecting part 41 overlaps with the joined end parts of adjacent two sub frames 1 which are adjacent thereto, the second connecting part 42 is on an inner side of the first connecting part 41 close to the area of the bottom plate 2111, and the second connecting part 42 faces and contacts the bottom plate 2111. The first connecting part 41 connects to the supporting plates 14 of adjacent two sub frames 1, and the second connecting part 42 connects to the bottom plate 2111. The arrangement of the second connector 4 enables adjacent sub frames 1 to join each other more firmly, and also enables the sub frames 1 to package and fix the bottom plate 211 more firmly.

In the present embodiment, angle iron and mounting screw(s) are used as the second connector 4. The angle iron connects the joined end parts of adjacent two sub frames 1 together by the mounting screw(s), and connects the sub frames 1 together with the back plate 211 by the mounting screw(s).

Embodiment 2

The present embodiment provides an outer frame, of which, unlike Embodiment 1, the surface of the first packaging plate contacting the liquid crystal screen is not provided with the first convex part. The surface of the supporting plate contacting the bottom plate is not provided with the second convex part, and the surface of the bottom plate contacting the supporting plate is not provided with the second concave part either. The surface of the second packaging plate contacting the back cover plate is not provided with the third concave part, and the surface of the back cover plate contacting the second packaging plate is not provided with the third convex part either.

Remaining structures of the outer frame in the present embodiment are the same as those of Embodiment 1 and are not described herein repetitively. Although the outer frame in the present embodiment is not provided with the above-described convex parts and concave parts, it can achieve excellent packaging for edges of a liquid crystal module all the same.

Embodiment 3

The present embodiment provides an outer frame, of which, unlike Embodiments 1-2, the surface of the supporting plate contacting the bottom plate is provided with a second concave part, the surface of the bottom plate contacting the supporting plate is provided with a second convex part, and the second convex part is located at a position corresponding to the second concave part and has a size and shape fitting to the second concave part. The arrangement of the second concave part enables the supporting plate to fit to the bottom plate more closely, such that the supporting plate can fix and package the bottom plate more firmly.

In the present embodiment, the surface of the second packaging plate contacting the back cover plate is provided with a third convex part, the surface of the back cover plate contacting the second packaging plate is provided with a third concave part, and the third concave part is located at a position corresponding to the third convex part and has a size and shape fitting to the third convex part. The arrangement of the third convex part enables the second packaging plate to fit to the back cover plate more closely, such that the second packaging plate can fix and package the back cover plate more firmly.

In the present embodiment, longitudinal sections of the second convex part and the second concave part have a rectangular shape, a triangular shape, a semicircular shape or an isosceles trapezoidal shape. Longitudinal sections of the third concave part and the third convex part have a rectangular shape, a triangular shape, a semicircular shape or an isosceles trapezoidal shape.

Remaining structures of the outer frame in the present embodiment are the same as those of any one of Embodiments 1-2 and are not described herein repetitively.

Embodiment 4

The present embodiment provides an outer frame, of which, unlike Embodiments 1-3, the surface of the supporting plate contacting the bottom plate is provided with a second convex part, the surface of the bottom plate contacting the supporting plate is provided with a third convex part, the positions of the second convex part and the third convex part are staggered, and the second convex part and the third convex part contact each other side by side. By means of such arrangement, the second convex part and the third convex part clasp each other tightly, so that the supporting plate fits to the bottom plate more closely, thereby allowing the supporting plate to fix and package the bottom plate more firmly.

In the embodiment, the surface of the second packaging plate contacting the back cover plate is provided with a fourth convex part, the surface of the back cover plate contacting the second packaging plate is provided with a fifth convex part, the fourth convex part and the fifth convex part are staggered, and the fourth convex part and the fifth convex part contact each other side by side. By means of such arrangement, the fourth convex part and the fifth convex part clasp each other tightly, so that the second packaging plate fits to the back cover plate more closely, thereby allowing the second packaging plate to fix and package the back cover plate more firmly.

In the present embodiment, longitudinal sections of the second convex part and the third convex part have a rectangular shape, a triangular shape, a semicircular shape or an isosceles trapezoidal shape; and longitudinal sections of the fourth convex part and the fifth convex part have a rectangular shape, a triangular shape, a semicircular shape or an isosceles trapezoidal shape.

Remaining structures of the outer frame in the present embodiment are the same as those of any one of Embodiments 1-3 and are not described herein repetitively.

The advantageous effect of Embodiments 1-4 is that, by providing the first accommodation groove and the second accommodation groove, not only the edges of the liquid crystal module can be well packaged, but also the edges of the back cover plate covering the back surface of the liquid crystal module can be well packaged and fixed. Since the edges of the liquid crystal module are accommodated within the first accommodation groove and the edges of the back cover plate are accommodated within the second accommodation groove, the packaging gaps at the edges of the display device is invisible after packaged with the outer frame, so the appearance of the display device packaged with the outer frame gets a better look. Meanwhile, compared to the outer frame in the prior art, the outer frame in Embodiments 1-4 can package the edges of the liquid crystal module 2 without the front frame, so that the entire thickness of the packaged display device is significantly reduced. In addition, edges of the liquid crystal module and the back cover plate can be packaged with the outer frame finally by means of sliding the edges within the first accommodation groove and the second accommodation groove, and the means of sliding significantly eases the mounting of the outer frame and makes the mounting of the outer frame more convenient and efficient.

Embodiment 5

The present embodiment provides a display device which includes an outer frame in any one of Embodiments 1-4.

By use of the outer frame in any one of Embodiments 1-4, gaps at edges of the display device are visible from a side view, so that the display device has a better look; meanwhile, since the display device does not need to provide any front frame, the thickness thereof is significantly reduced.

It can be understood that the foregoing implementations are merely exemplary implementations used for describing the principle of the present invention, but the present invention is not limited thereto. Those of ordinary skill in the art may make various variations and improvements without departing from the spirit and essence of the present invention, and these variations and improvements shall fall into the protection scope of the present invention.

The invention claimed is:

1. An outer frame for packaging edge of a liquid crystal module, the outer frame including at least one sub frame, wherein, the sub frame comprises a side plate, a first packaging plate, a second packaging plate and a supporting plate, the side plate, the first packaging plate, the second packaging plate and the supporting plate are formed integrally, a first accommodation groove for accommodating an edge of the liquid crystal module including an entire backlight module is formed by the side plate, the first packaging plate and the supporting plate, and a second accommodation groove for accommodating an edge of a back cover plate configured to cover a back surface of the liquid crystal module is formed by the side plate, the supporting plate and the second packaging plate, wherein the first packaging plate and the second packaging plate are parallel to the supporting plate disposed therebetween, the side plate is perpendicular to the first packaging plate, the second packaging plate and the supporting plate, and the first accommodation groove has a same opening direction as the second accommodation groove;

wherein the liquid crystal module further includes a liquid crystal screen; the backlight module includes a back plate, a reflective sheet, a light guide plate and an optical film sheet sequentially provided on a bottom plate of the back plate, a plastic frame provided at edges of the back plate, and a light source provided on the back plate; the liquid crystal screen is provided on a side of the optical film sheet away from the bottom plate of the back plate;

the first packaging plate is configured to face and contact an edge of an upper surface of the liquid crystal screen away from the backlight module, the supporting plate is configured to face and contact an edge of a lower surface of the bottom plate away from the liquid crystal screen, and the side plate is configured to face and contact an outer surface of the plastic frame away from an end surface at the edge of the liquid crystal screen; and the second packaging plate is configured to face and contact an edge of a lower surface of the back cover plate away from the liquid crystal module, and the side plate is further configured to face an end surface at the edge of the back cover plate.

2. The outer frame according to claim 1, wherein a surface of the first packaging plate contacting the liquid crystal screen is provided with a first convex part which contacts the liquid crystal screen; and/or a surface of the supporting plate contacting the bottom plate is provided with a second convex part, a surface of the bottom plate contacting the supporting plate is provided with a second concave part, and the second convex part is located at a position corresponding to the second concave part and has a size and shape fitting to the second concave part; and/or a surface of the second packaging plate contacting the back cover plate is provided with a third concave part, a surface of the back cover plate contacting the second packaging plate is provided with a third convex part, and the third concave part is located at a position corresponding to the third convex part and has a size and shape fitting to the third convex part.

3. The outer frame according to claim 2, wherein longitudinal section of the first convex part has a rectangular shape, a triangular shape, a semicircular shape or an isosceles trapezoidal shape;

longitudinal sections of the second convex part and the second concave part have a rectangular shape, a triangular shape, a semicircular shape or an isosceles trapezoidal shape; and longitudinal sections of the third concave part and the third convex part have a rectangular shape, a triangular shape, a semicircular shape or an isosceles trapezoidal shape.

4. The outer frame according to claim 3, wherein a surface of the side plate opposite to the plastic frame is set to a cambered surface which protrudes in a direction away from the end surface at the edge of the liquid crystal module.

5. The outer frame according to claim 2, wherein a surface of the side plate opposite to the plastic frame is set to a cambered surface which protrudes in a direction away from the end surface at the edge of the liquid crystal module.

6. The outer frame according to claim 1, wherein a surface of the supporting plate contacting the bottom plate is provided with a second concave part, a surface of the bottom plate contacting the supporting plate is provided with a second convex part, and the second concave part is located at a position corresponding to the second convex part and has a size and shape fitting to the second convex part; and/or a surface of the second packaging plate contacting the back cover plate is provided with a third convex part, a surface of the back cover plate contacting the second packaging plate is provided with a third concave part, and the third concave part is located at a position corresponding to the third convex part and has a size and shape fitting to the third convex part.

7. The outer frame according to claim 6, wherein longitudinal sections of the second convex part and the second concave part have a rectangular shape, a triangular shape, a semicircular shape or an isosceles trapezoidal shape; and longitudinal sections of the third concave part and the third convex part have a rectangular shape, a triangular shape, a semicircular shape or an isosceles trapezoidal shape.

8. The outer frame according to claim 7, wherein a surface of the side plate opposite to the plastic frame is set to a cambered surface which protrudes in a direction away from the end surface at the edge of the liquid crystal module.

9. The outer frame according to claim 6, wherein a surface of the side plate opposite to the plastic frame is set to a cambered surface which protrudes in a direction away from the end surface at the edge of the liquid crystal module.

10. The outer frame according to claim 1, wherein a surface of the supporting plate contacting the bottom plate is provided with a second convex part, a surface of the bottom plate contacting the supporting plate is provided with a third convex part, the positions of the second convex part and the third convex part are staggered, and the second convex part and the third convex part contact each other side by side; and/or a surface of the second packaging plate contacting the back cover plate is provided with a fourth convex part, a surface of the back cover plate contacting the second packaging plate is provided with a fifth convex part, the fourth convex part and the fifth convex part are staggered, and the fourth convex part and the fifth convex part contact each other side by side.

11. The outer frame according to claim 10, wherein longitudinal sections of the second convex part and the third convex part have a rectangular shape, a triangular shape, a semicircular shape or an isosceles trapezoidal shape; and longitudinal sections of the fourth convex part and the fifth convex part have a rectangular shape, a triangular shape, a semicircular shape or an isosceles trapezoidal shape.

12. The outer frame according to claim 10, wherein a surface of the side plate opposite to the plastic frame is set to a cambered surface which protrudes in a direction away from the end surface at the edge of the liquid crystal module.

13. The outer frame according to claim 1, wherein a surface of the side plate opposite to the plastic frame is set to a cambered surface which protrudes in a direction away from the end surface at the edge of the liquid crystal module.

14. The outer frame according to claim 1, wherein the supporting plate is provided with at least one first connecting hole, and the bottom plate is provided with at least one second connecting hole at the position corresponding to the first connecting hole; and the outer frame further includes a first connector which enables to pass through the first connecting hole and the second connecting hole to connect and fix the supporting plate and the bottom plate.

15. The outer frame according to claim 1, including a plurality of the sub frames configured to package various edges of the liquid crystal module, respectively, and end parts of adjacent ones of the sub frames join each other.

16. The outer frame according to claim 15, further including a second connector, which connects the joined end parts of two adjacent sub frames which are adjacent thereto and is provided at a side of the supporting plate facing the second packaging plate.

17. The outer frame according to claim 16, wherein the second connector includes a first connecting part and a second connecting part connected integrally, the first connecting part overlaps with the joined end parts of two adjacent sub frames which are adjacent thereto, the second connecting part is on an inner side of the first connecting part close to the area of the bottom plate, and the second connecting part faces and contacts the bottom plate; and the first connecting part connects to the supporting plates of two adjacent sub frames which are adjacent thereto, and the second connecting part connects to the bottom plate.

18. A display device including the outer frame according to claim 1.

* * * * *